US012160150B2

(12) United States Patent
Misaki et al.

(10) Patent No.: US 12,160,150 B2
(45) Date of Patent: Dec. 3, 2024

(54) ROTARY ELECTRICAL MACHINE

(71) Applicant: Hitachi Astemo Electric Motor Systems, Ltd., Hitachinaka (JP)

(72) Inventors: Seigo Misaki, Hitachinaka (JP); Takayuki Koizumi, Hitachinaka (JP); Shingo Kitajima, Hitachinaka (JP); Hisaya Shimizu, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 316 days.

(21) Appl. No.: 17/763,097

(22) PCT Filed: Oct. 21, 2019

(86) PCT No.: PCT/JP2019/041256
§ 371 (c)(1),
(2) Date: Mar. 23, 2022

(87) PCT Pub. No.: WO2021/079397
PCT Pub. Date: Apr. 29, 2021

(65) Prior Publication Data
US 2022/0393540 A1 Dec. 8, 2022

(51) Int. Cl.
H02K 3/50 (2006.01)
(52) U.S. Cl.
CPC ........... *H02K 3/50* (2013.01); *H02K 2203/09* (2013.01)
(58) Field of Classification Search
CPC ................................. H02K 3/50; H02K 2/203
(Continued)

(56) References Cited

U.S. PATENT DOCUMENTS

2009/0127948 A1 5/2009 Shimizu et al.
2015/0097453 A1 4/2015 Nishikawa et al.

FOREIGN PATENT DOCUMENTS

CN 101436796 A 5/2009
CN 109586461 A 4/2019
(Continued)

OTHER PUBLICATIONS

International Search Report (PCT/ISA/210) issued in PCT Application No. PCT/JP2019/041256 dated Jan. 7, 2020 with English translation (five (5) pages).
(Continued)

Primary Examiner — Jose A Gonzalez Quinones
(74) Attorney, Agent, or Firm — Crowell & Moring LLP

(57) ABSTRACT

To provide a rotary electrical machine having a novel configuration adapted to provide axial downsizing of the rotary electrical machine when connecting an electrical connection conductor to a welded side terminal section of a coil end of a segment coil. The rotary electrical machine includes: a stator core 21 including slots radially extended in a radial fashion; a plurality of segment coils 34 radially stacked and accommodated in the slot 37; and a neutral point bus-bar 33 laid on a side of a welded coil end of the segment coil 34 and including a connection wiring section and a connection section for interconnecting the different segment coils. In a state where the segment coils 34 are mounted, at least a part of the connection wiring section is laid in a radial space RS radially defined by the segment coils 34. The connection wiring section can be laid in the radial space RS radially defined by the segment coils 34 so that axial elongation of a configuration space for the electrical connection conductor 33 is prevented. Thus, the axial downsizing of the rotary electrical machine can be achieved.

11 Claims, 12 Drawing Sheets

(58) Field of Classification Search
USPC .......................................................... 310/71
See application file for complete search history.

(56) References Cited

FOREIGN PATENT DOCUMENTS

| JP | 2006-211779 A | | 8/2006 | |
|---|---|---|---|---|
| JP | 2011-45165 A | | 3/2011 | |
| JP | 2011045165 A | * | 3/2011 | |
| JP | 2015-76905 A | | 4/2015 | |
| JP | 2017-184558 A | | 10/2017 | |
| JP | 2019-115178 A | | 7/2019 | |
| WO | WO-2013005238 A1 | * | 1/2013 | ............... H02K 1/16 |

OTHER PUBLICATIONS

Japanese-language Written Opinion (PCT/ISA/237) issued in PCT Application No. PCT/JP2019/041256 dated Jan. 7, 2020 (four (4) pages).
Chinese-language Office Action issued in Chinese Application No. 201980100423.1 dated Aug. 8, 2024 with English translation (18 pages).

* cited by examiner

ROTARY ELECTRICAL MACHINE

TECHNICAL FIELD

The present invention relates to a rotary electrical machine. More particularly, the present invention relates to the rotary electrical machine which includes: a stator core including a plurality of slots; and a stator including a plurality of segment coils accommodated in the slots of the stator core.

BACKGROUND ART

Electrical vehicles and hybrid vehicles are configured to produce a drive force by means of a rotary electrical machine. The following machine is used as such a rotary electrical machine. Namely, the rotary electrical machine includes: a stator core including a plurality of slots; and a stator including a plurality of segment coils made of copper and accommodated in the slots of the stator core. The rotary electrical machine equipped with such a stator is disclosed in, for example, Japanese Patent Application Laid-Open No. 2019-115178 (Patent Literature 1).

The rotary electrical machine disclosed in Patent Literature 1 includes: a stator core including a plurality of slots axially extended on an inner circumferential surface; and the copper segment coils inserted in the slots. An electrical connection conductor connected to the segment coil, a so-called bus-bar, is connected to a top of a welded side terminal section of a coil end (terminal section of a so-called welded side coil end) of the segment coil axially protruding from an end face section of the stator core.

This electrical connection conductor is laid in a slot arrangement direction (circumferential direction) in a manner to cover the welded sections of the coil ends, or in a manner to extend over the plural slots. The electrical connection conductor can be used as a three-phase terminal bus-bar for supplying an electric power to the coils or a neutral point bus-bar interconnecting neutral points of individual phase coils. With this, the electric power can be supplied to the individual phase coils or the neutral points of the individual phase coils can be interconnected.

CITATION LIST

Patent Literature

PTL 1: Japanese Patent Application Laid-Open No. 2019-115178

SUMMARY OF INVENTION

Technical Problem

The rotary electrical machine of this type is used in automobiles and the like. Hence, the rotary electrical machine is required to be accommodated in a narrow space, or particularly required to be axially downsized. According to the rotary electrical machine disclosed in Patent Literature 1, however, the electrical connection conductor is laid in the slot arrangement direction (circumferential direction) in a manner to cover the welded sections of the coil ends or in a manner to extend over the plural slots.

As seen in the axial direction of the rotary electrical machine, therefore, the electrical connection conductor inevitably must be laid over the top of the welded side terminal section at the coil end of the segment coil. Therefore, a configuration space for the electrical connection conductor is excessively elongated in the axial direction accordingly. This leads to a new problem that at least axial downsizing of the rotary electrical machine is interfered with.

It is an object of the present invention to provide a rotary electrical machine having a novel configuration adapted to permit the axial downsizing of the rotary electrical machine when extending the electrical connection conductor to the welded side terminal section of the coil end of the segment coil.

Solution to Problem

According to an aspect of the present invention, a rotary electrical machine includes: a stator core including a plurality of slots radially extended in a radial fashion; a plurality of segment coils radially stacked and accommodated in the slots; and an electrical connection conductor which includes a connection wiring section and a connection section and which is laid on a side of a welded coil end of the segment coil and interconnects different segment coils, and has a configuration wherein in a state where the segment coils are mounted, at least a part of the connection wiring section is laid in a radial space radially defined by the segment coils.

Advantageous Effects of Invention

According to the present invention, the connection wiring section is laid in the radial space radially defined by the segment coils so as to inhibit the axial elongation of the configuration space for the electrical connection conductor. Thus, the axial downsizing of the rotary electrical machine can be achieved.

DESCRIPTION OF EMBODIMENTS

Embodiments of the present invention will hereinbelow be described in detail with reference to the accompanying drawings. It is noted, however, that the present invention is not limited to the following embodiments hereof but can also include a variety of modifications and applications thereof within a scope of technical concepts of the present invention.

Example 1

Figure 1:
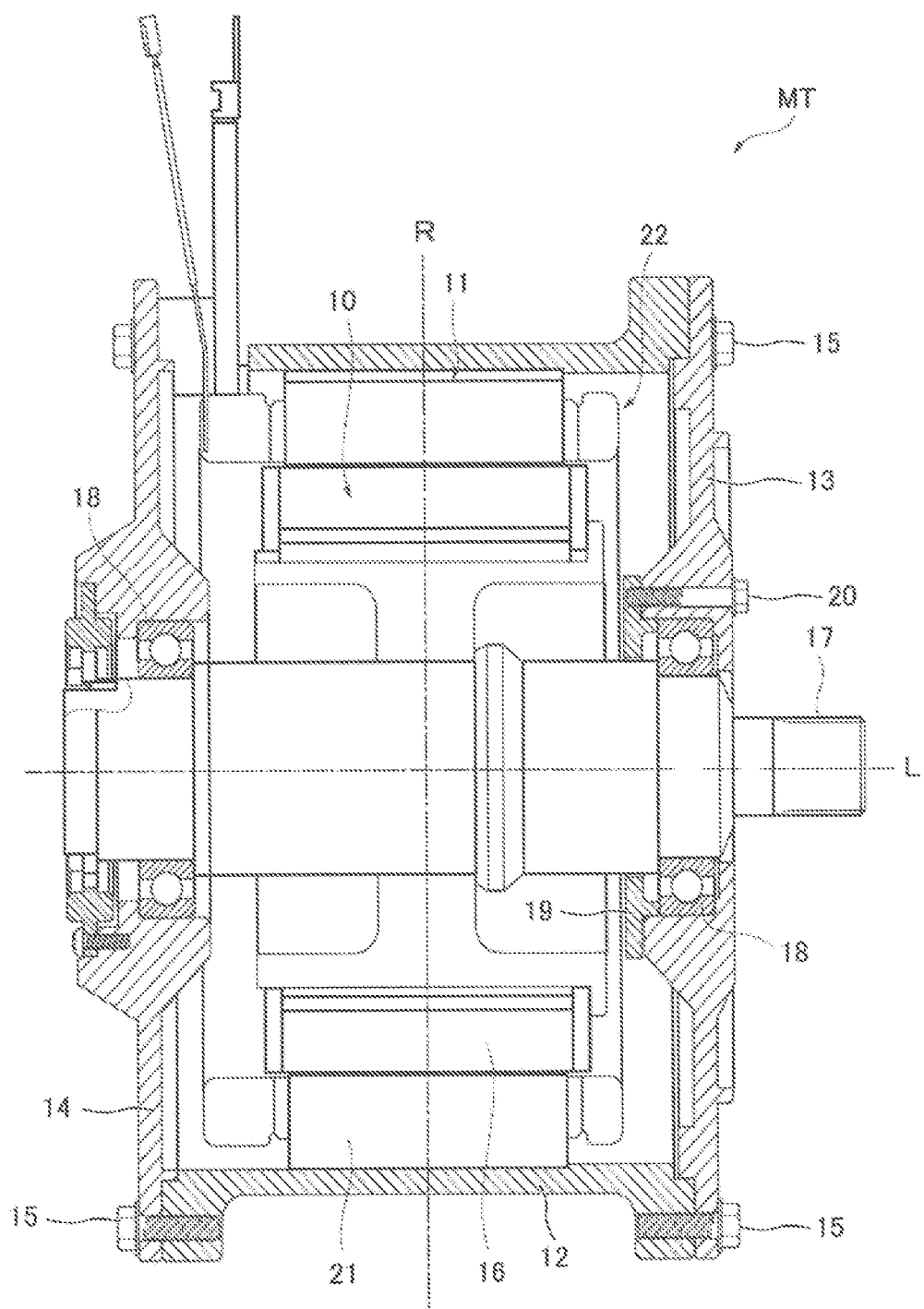
FIG. 1 is a sectional view showing an axial section of a rotary electrical machine according to the present invention.

FIG. 1 is a sectional view of a rotary electrical machine MT subjected to the present invention. The rotary electrical machine MT according to the embodiment is mounted in automobiles such as electric vehicles equipped with no internal-combustion engine, and hybrid vehicles equipped with the internal combustion engine. The rotary electrical machine is equipped with a function as an electric motor for generating a drive power and a function as an electrical generator for generating an electrical power during braking. Incidentally, the generated electrical power is stored in a battery or the like on board the vehicle.

The rotary electrical machine MT principally includes a rotor 10 and a stator 11. The rotor 10 and the stator 11 are accommodated in a storage space defined by an annular housing 12 open at opposite ends; a front cover 13 and a rear cover 14 closing apertures on the opposite sides of the housing 12. The front cover 13 and the rear cover 14 are fixed to the housing 12 by means of bolts 15.

The rotor 10 includes, for example: a rotor core 16 substantially shaped like a column formed by stacking a plurality of flat electromagnetic steel sheets along an axis line (L); and drive shaft 17 fixed in a central interior portion of the rotor core 16. Although not shown in the figure, the rotor core 16 includes: a plurality of magnet insertion holes circumferentially arranged at equal angular intervals; and a plurality of magnets (such as neodymium magnets and ferrite magnets) inserted and fixed in the magnet insertion holes.

The drive shaft 17 is pivotally supported by two bearings 18 disposed at opposite ends thereof and is unitarily rotated with the rotor core 16 about the axis line (L) of the rotor core 16. The bearings 18 are disposed on the inner side of the front cover 13 and the rear cover 14. The bearing 18 at the front cover 13 is supported by a retainer 19 which is fixed to the front cover 13 by means of a bolt 20. The drive shaft 17 applies a rotative force to drive wheels (not shown) via a speed reduction mechanism (not shown) and is applied with the rotative force from the drive wheels.

The stator 11 includes: a stator core 21 substantially formed in an annular shape by stacking a plurality of flat electromagnetic steel sheets along the axis line (L); and a coil 22 wound around the stator core 21.

The rotor core 16 is rotatably disposed on the inner side of the stator core 21 via a minor gap in a radial direction (R) of the stator core 21, so that the axis line (L) of the stator core 21 is aligned with the axis line (L) of the rotor core 16. Since the configuration of the rotary electrical machine including these components is well known in the art, a more detailed description thereof is dispensed with.

Figure 2:
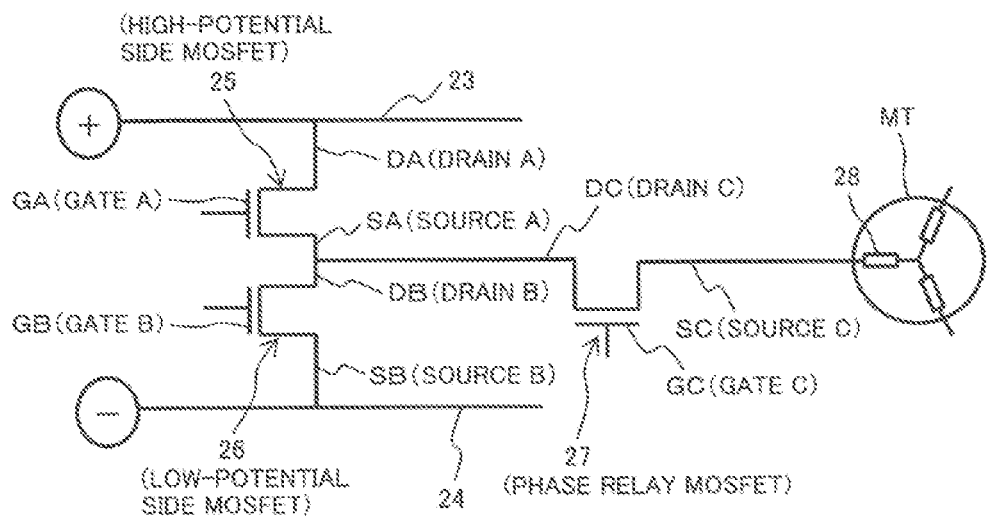
FIG. 2 is a circuit diagram schematically showing a configuration of a drive circuit of the rotary electrical machine.

FIG. 2 schematically shows a configuration of a drive circuit (power converter circuit) for driving the above-described rotary electrical machine MT. The figure shows as an example of a drive circuit (power converter circuit) of one phase (such as U-phase). Referring to FIG. 2, the power converter circuit is generally known as an inverter circuit, which essentially has a configuration shown in FIG. 2.

FIG. 2 shows a circuit configuration of one phase, where a high-potential side MOSFET 25 and a low-potential side MOSFET 26 are connected in series between a positive electrode (=power source) side power source line 23 and a negative electrode (=ground) side power source line 24. Further, a phase relay MOSFET 27 is connected to one coil (such as U-phase) 28 of an electric motor.

The high-potential side MOSFET 25 includes a drain DA, a gate GA, and a source SA. The drain DA is connected to the positive electrode side power source line 23. The low-potential side MOSFET 26 includes a drain DB, a gate GB, and a source SB. The source SB is connected to the negative electrode side power source line 24. The source SA of the high-potential side MOSFET 25 is connected to the drain DB of the low-potential side MOSFET 26.

The phase relay MOSFET 27 includes a drain DC, a gate GC, and a source SC. The drain DC is connected to a connection point between the source SA of the high-potential side MOSFET 25 and the drain DB of the low-potential side MOSFET 26. The source SC is connected to a coil 28.

Therefore, a controlled electric power can be supplied to the coil 28 of the rotary electrical machine MT by applying a control signal from an unillustrated control circuit section to the respective gates GA, GB, GC of the high-potential side MOSFET 25, the low-potential side MOSFET 26, and the phase relay MOSFET 27.

FIG. 2 shows a circuit configuration related to one phase. As for the remaining two phases, the same power converter circuit is similarly connected between the positive electrode side power source line 23 and the negative electrode side power source line 24. It is also possible to omit the phase relay MOSFET 27.

Figure 3:
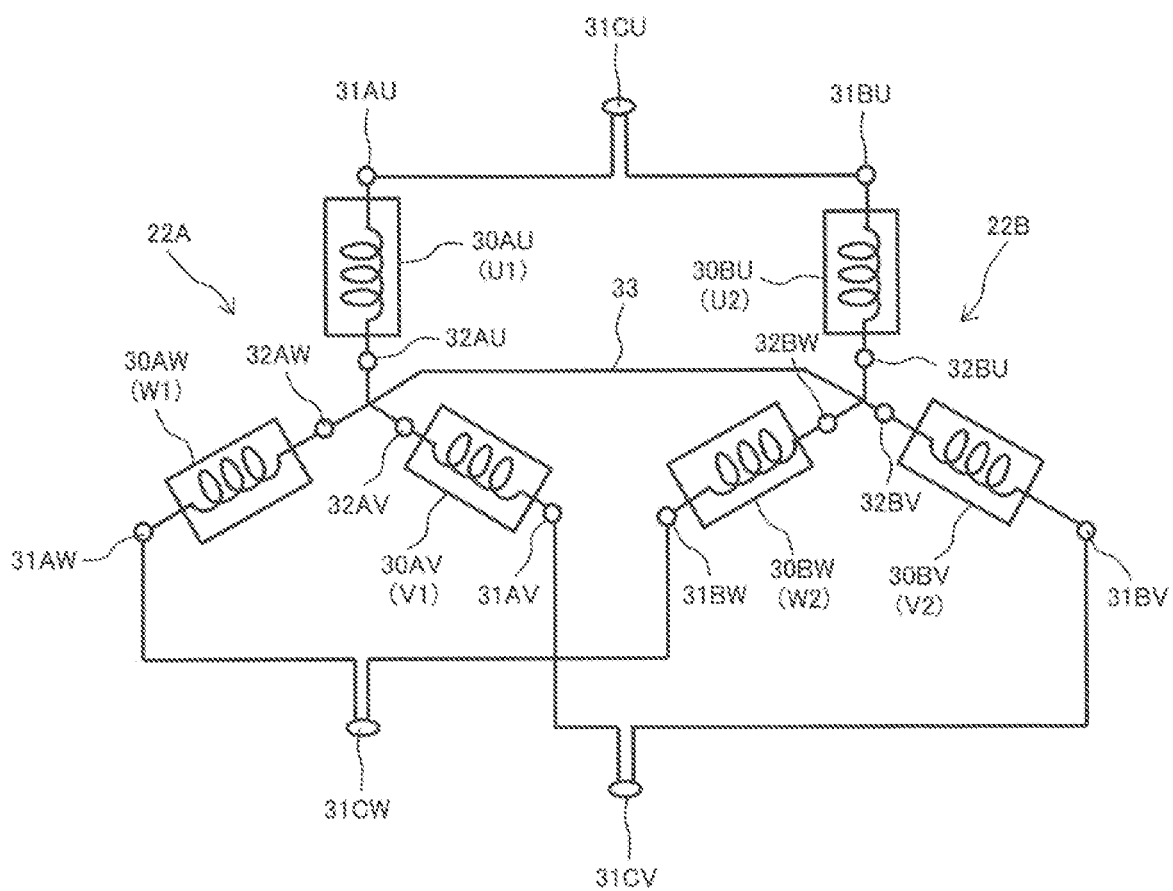
FIG. 3 is an explanatory diagram illustrating wire connections of coils wound on stator cores.

Next, the description is made on a coil wiring connection method for the rotary electrical machine MT. FIG. 3 shows a wire connection method for the coil 22 of the rotary electrical machine MT shown in FIG. 1. The connection method is referred to as "double star connection". Specifically, the figure shows a configuration where two coil assemblies 22A, 22B each including star-connected coils are provided and these two coil assemblies 22A, 22B are driven at the same time.

One of the coil assemblies (hereinafter, referred to as first coil assembly) 22A includes a first U-phase coil 30AU, a first V-phase coil 30AV and a first W-phase coil 30AW, which are connected to respective input terminals thereof. Similarly, the other coil assembly (hereinafter, referred to as second coil assembly) 22B includes a second U-phase coil 30BU, a second V-phase coil 30BV and a second W-phase coil 30BW, which are connected to respective input terminals thereof.

Since the coils are connected according to the double star connection method, a first U-phase input terminal 31AU of the first U-phase coil 30AU and a second U-phase input terminal 31BU of the second U-phase coil 30BU receive a U-phase input signal from the same U-phase input section 31CU.

Similarly, a first V-phase input terminal 31AV of the first V-phase coil 30AV and a second V-phase input terminal 31BV of the second V-phase input terminal 30BV also receive a V-phase input signal from the same V-phase input section 31CV. Further, the first W-phase input terminal 31AW of the first W-phase coil 31AW and the second input terminal 31BW of the second W-phase coil 30BW also receive a W-phase input signal from the same W-phase input section 31CW.

As for a neutral point, a first U-phase neutral point 32AU of the first U-phase coil 30AU, a first V-phase neutral point 32AV of the first V-phase coil 30AV, and a first W-phase neutral point 32AW of the first W-phase coil 30AW are each electrically interconnected. Similarly, a second U-phase neutral point 32BU of the second U-phase coil 30BU, a second V-phase neutral point 32BV of the second V-phase coil 30BV, and a second W-phase neutral point 32BW of the second W-phase coil 30BW are each electrically interconnected.

The neutral points of the respective phases 32AU, 32AV, 32AW, 32BU, 32BV, 32BW are electrically interconnected by means of an electrical connection conductor 33. The electrical connection conductor 33 functions as a neutral point bus-bar as a subject of the embodiment. This electrical connection connector 33 may be formed of one elongate unbroken flat plate or otherwise, formed by combining a plurality of segmented elongate pieces of flat plate. The details of these electrical connection conductors will be described herein later.

The individual phase coils 30AU, 30AV, 30AW, 30BU, 30BV, 30BW may be in the form of phase coils serially interconnecting segmented coil groups or in the form of phase coils parallelly interconnecting the segmented coil groups. The connection mode of these phase coils may be properly selected according to the specifications of the rotary electrical machine.

Figure 4:
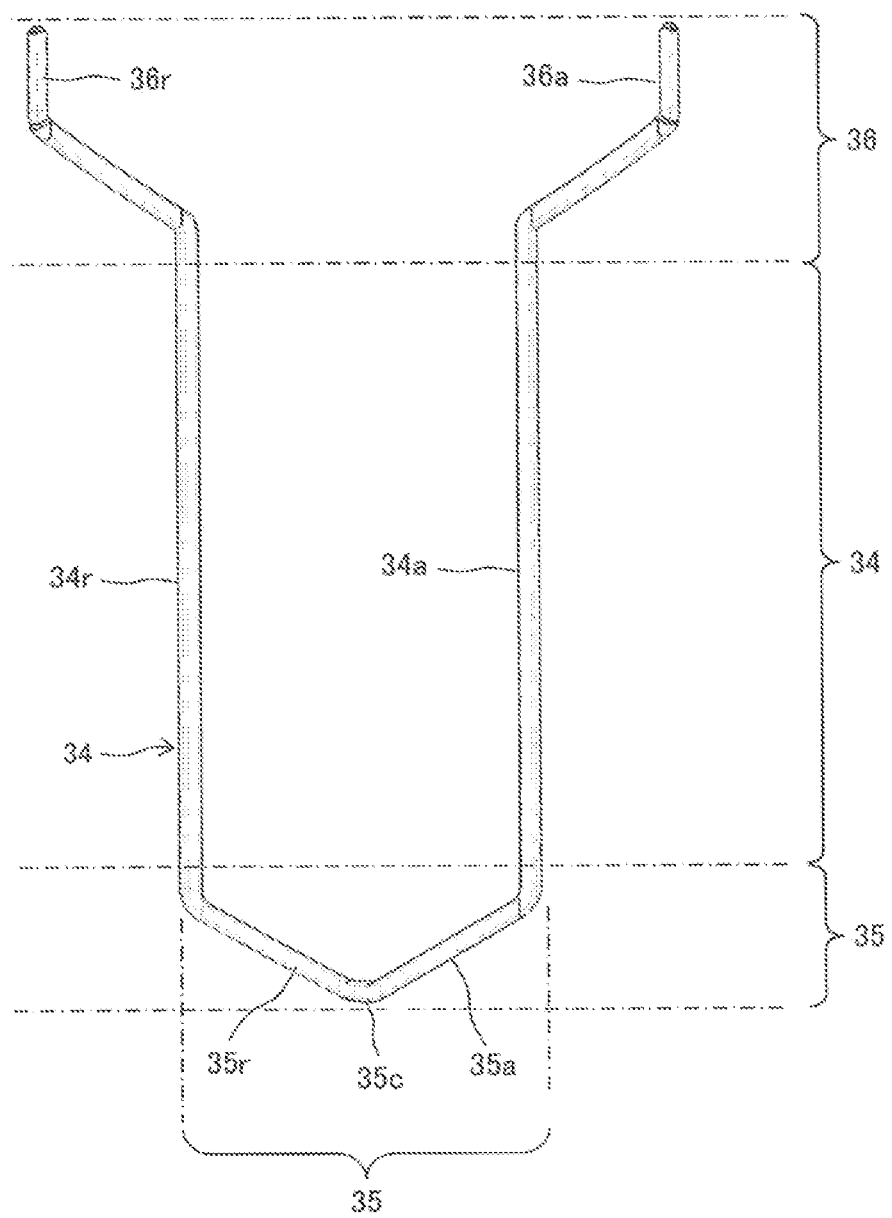
FIG. 4 is an explanatory diagram illustrating a segment coil accommodated in the slot of the stator core.

Next, the description is made on a configuration of the segment coil. FIG. 4 illustrates a configuration of the segment coil before accommodated in the slot.

Referring to FIG. 4, a segment coil 34 includes a pair of linear sections 34a, 34r to be disposed in the slot (not shown) formed in the stator core 21. The segment coil is formed with a turn section 35 in a manner to interconnect respective one ends of the paired linear sections 34a, 34r. Further, the segment coil is open at the other ends of the linear sections 34a, 34r, at which ends formed are welded terminal sections 36a, 36r. Thus, a turndown side coil end 35 and a welded side coil end 36 are formed.

The turn section 35 as the turndown side coil end is substantially centrally formed with a top 35c. The top 35c is connected to the linear section 34a via an intermediate inclination section 35a on one side thereof and is connected to the linear section 34r via an intermediate inclination section 35r on the other side thereof. With the segment coil 34 inserted in the slot 22, therefore, the turn section 35 is in the form of chevron as seen in the radial direction. As just described, the segment coil 34 is substantially formed in a "U" shape by the pair of linear sections 34a, 34r and the turn section 35 so turned down as to interconnect the pair of linear sections 34a, 34r.

The welded terminal sections 36a, 36r are electrically connected with the welded terminal sections 36a, 36r of other segment coils by welding. The phase coil can be formed by repeating these operations. Incidentally, these matters are already known well.

Figure 5:
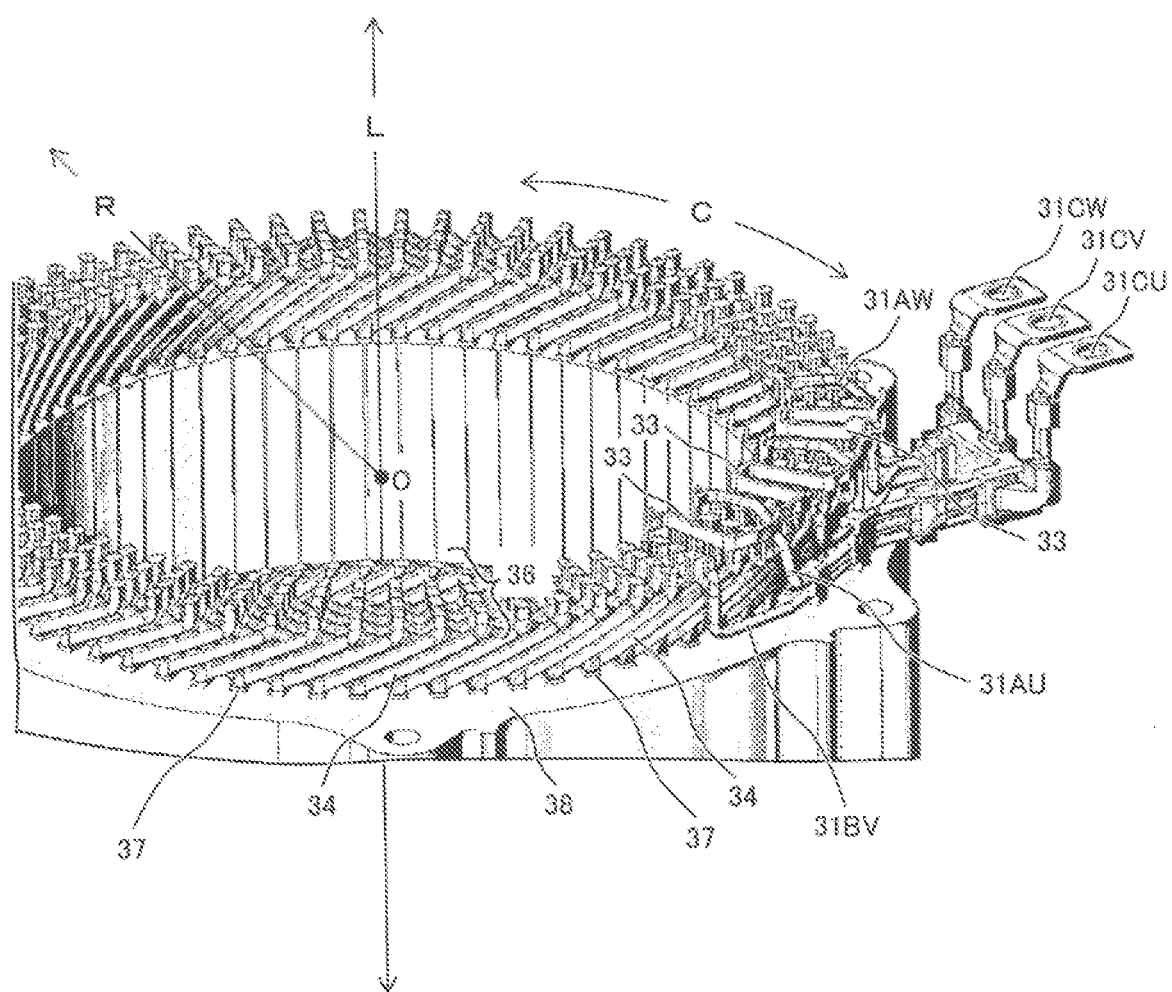
FIG. 5 is an enlarged perspective view showing the stator core and segment coils arranged on the stator core.

FIG. 5 is an illustration of the stator 11 extracted from the rotary electrical machine MT of in FIG. 1, as seen from diagonally above. Referring to FIG. 5, the annular stator core 21 includes a plurality of slit-like slots 37 (see FIG. 6) on an inner circumference thereof, where the slots are arranged with equal angular spacing in a circumferential direction (C) of the stator core and extended toward outside in a radial direction (R).

The slots 37 formed in an inner circumferential surface of the stator core 21 penetrates the stator core 21 in an axial (L) direction of the stator core 21 or extending from one end face section 38 to the other end face section (not shown) as seen in the axial (L) direction of the stator core. It is noted here that the end face section 38 on one side is where the welded side coil ends 36 are located, while the end face section on the other side is where the turndown side coil ends (turn section) 35 are located.

The stator core 21 is formed with a predetermined number of slots 37 arranged with equal angular space intervals in the circumferential direction (C). The segment coils 34 are disposed in the individual slots 37. In this manner, the slots 37 are formed on the stator core 21 in a radial pattern about the axis line (L).

AS shown in FIG. 5, the segment coil 34 disposed on the stator core 21 includes, as seen in the radial direction (R) of the stator core 21: a first coil group (see FIG. 6) arranged on an inner circumferential side; a second coil group (see FIG. 6) arranged on an outside of the first coil group; a third coil group (see FIG. 6) arranged on an outside of the second coil group; and a fourth coil group (see FIG. 6) arranged on an outside of the third coil group. In one slot 37, therefore, eight segment coils 34 are stacked on top of each other from the inner circumferential side toward the outer circumferential side. The arrangement of the segment coils will be described with reference to FIG. 6 and FIG. 7.

Since the embodiment features the "double star connection" as described above, the first U-phase coil 30AU to the first W-phase coil 30AW and the second U-phase coil 30BU to the first W-phase coil 30BW are accommodated in the slot 37 in a predetermined order as shown in FIG. 3. Further, the first U-phase coil 30AU to the first W-phase coil 30AW and the second U-phase coil 30BU to the second W-phase coil 30BW are respectively connected with an input terminal of a corresponding phase.

Figure 8:
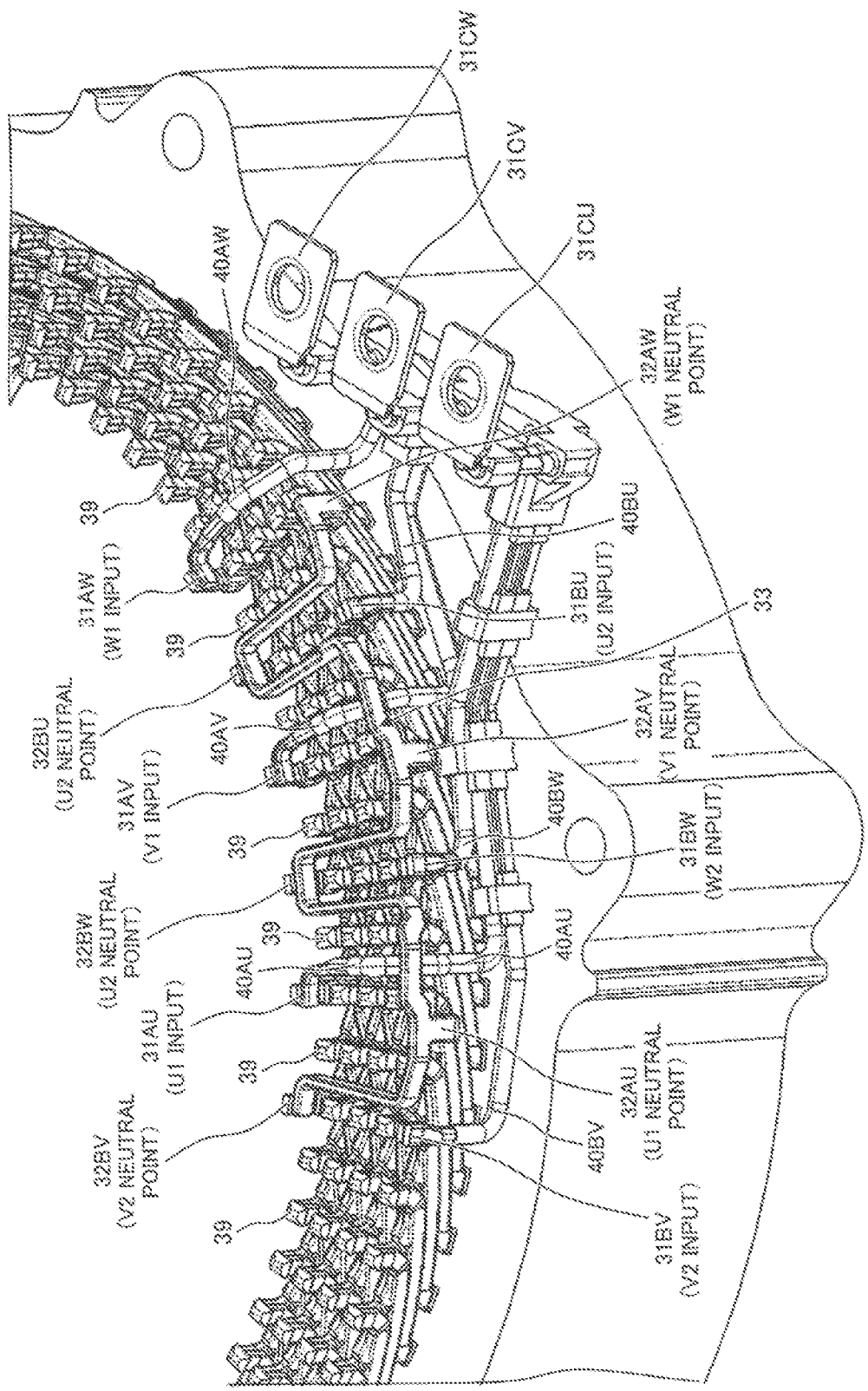
FIG. 8 is an enlarged perspective view, as seen from diagonally above, of areas around input sections and areas around neutral points of the phase coils of the individual phases according to an embodiment of the present invention.

As specifically shown in FIG. 8, the first U-phase input terminal 31AU of the first U-phase coil 30AU and the second U-phase input terminal 31BU of the second U-phase coil 30BU receive a U-phase input signal from their shared U-phase input section 31CU. Similarly, the first V-phase input terminal 31AV of the first V-phase coil 30AV and the second V-phase input terminal 31BV of the second V-phase coil 30BV receive a V-phase input signal from their shared V-phase input section 31CV. Further, the first W-phase input terminal 31AW of the first W-phase coil 30AW and the second W-phase input terminal 31BW of the second W-phase coil 30BW receive a W-phase input signal from their shared W-phase input section 31CW.

The neutral points 32AU, 32AV, 32AW, 32BU, 32BV, 32BW of the respective phase coils shown in FIG. 3 are electrically connected by means of the electrical connection conductor 33. The electrical connection connector 33 is formed by bending and folding an elongate piece of metal sheet in the same plane shape. The electric connection connector electrically connects the neutral points 32AU, 32AV, 32AW, 32BU, 32BV, 32BW of the respective phases according to an arrangement order. A specific configuration and placement position of the electrical connection conductor 33 will be described in detail with reference to FIG. 8 to FIG. 10.

Figure 6:
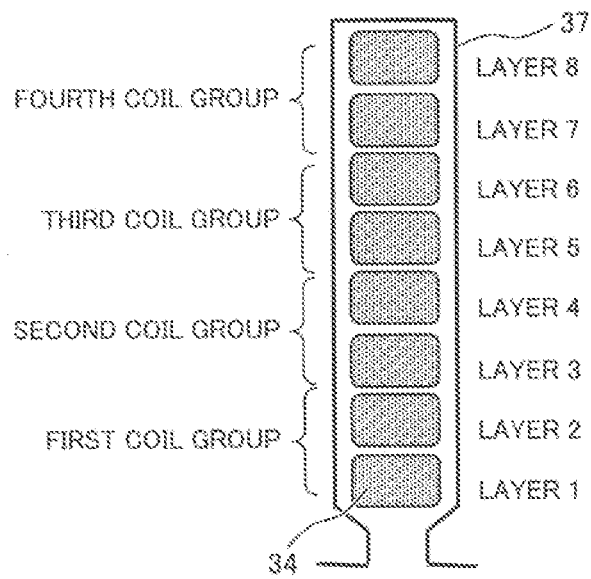
FIG. 6 is an explanatory diagram illustrating the arrangement of the segment coils accommodated in the slot.

The segment coils 34 are accommodated in the slot 37. As shown in FIG. 6, eight segment coils 34 are radially stacked on top of each other in one slot 37 to form layer 1 to layer 8. Provided that segment coils 34 accommodated in a predetermined number of circumferential slots 37 form one coil group in one phase coil, and that the segment coils on the innermost circumference side form a first coil group, the embodiment is constituted by four coil groups, which include the first coil group on the innermost circumference, a second coil group on the outer side of the first coil group, a third coil group on the outer side of the second coil group, and a fourth coil group on the outer side of the third coil group.

Figure 7:
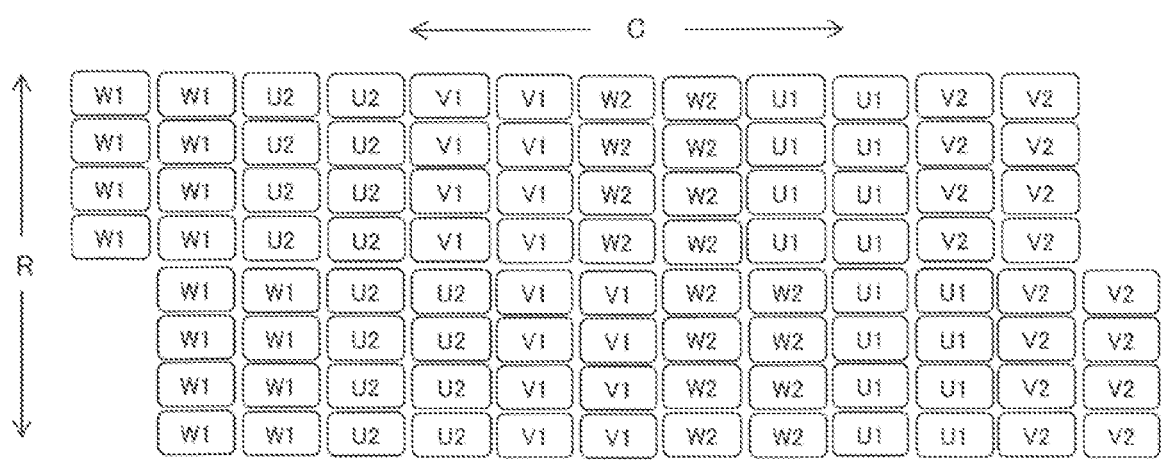
FIG. 7 is a diagram illustrating a relation of electrical phases of the segment coils arranged in the individual slots as stacked in a radial direction of the stator core.

As shown in FIG. 7, the embodiment defines the number of slots of each pole and each phase as [2]. Hence, two slots 37 of each of the U-phase, V-phase and W-phase are arranged side by side in the circumferential direction (C) such as U-phase, U-phase, V-phase, V-phase, W-phase, W-phase, . . . . In FIG. 7, the slots are arranged in conformity with the "double star connection" or in the order of [W1, W1], [U2, U2], [V1, V1] [W2, W2], [U1, U1], [V2, V2].

It is noted here that the individual phase coils of the first coil assembly 22A may sometimes be written as [W1], [U1], [V1] and the individual phase coils of the second coil assembly may similarly be written as [W2], [U2], [V2].

According to the embodiment as shown in FIG. 7, a span of one piece of coil is shunted on the way so that the coils in the slot are divided into inside four coils and outside four coils. Thus, the coils are arranged in a manner that the outside four coils are displaced from the inside four coils by one slot.

It is noted that a placement relation between the segment coils 34 in circumferential direction (C) and the segment coils 34 in the radial direction (R) shown in FIG. 7 is meant for an example. It goes without saying that other placement relations than this are also adoptable. Since the subject matter of the embodiment is the configuration and arrangement pattern of the electrical connection conductor 33 constituting the neutral point bus-bar, the placement relation between the segment coils 34 in the circumferential direction (C) and the segment coils 34 in the radial direction (R) is not essential and is not necessarily limited to this relation.

Figure 9:
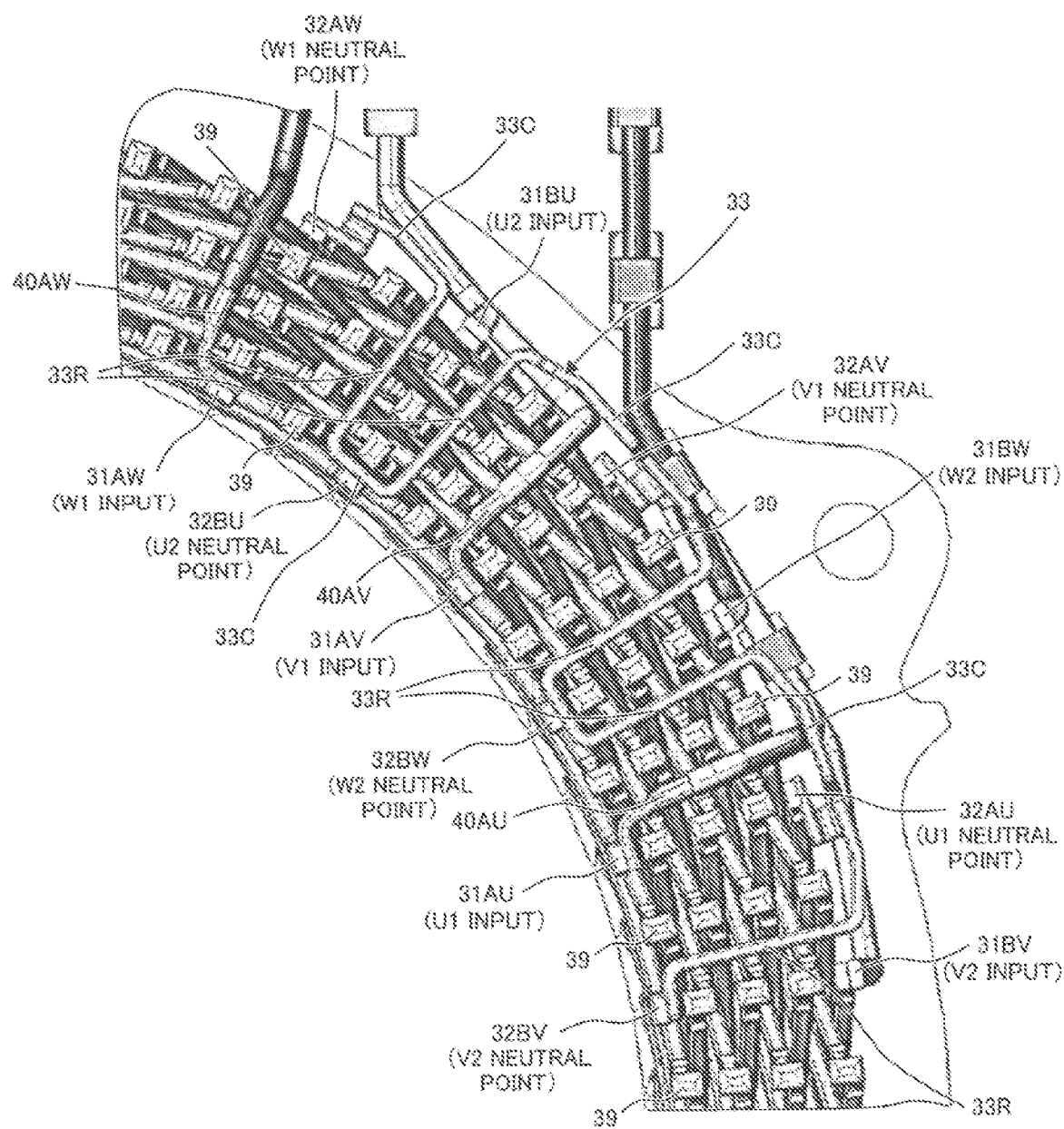
FIG. 9 is an enlarged view, as seen in an axial direction, of the areas around the input sections and the areas around the neutral points of the phase coils of the individual phases shown in FIG. 8.

Next, a more detailed description is made on the embodiment. FIG. 8 shows the input section and a terminal slot of the respective phases in enlarged dimension, as seen in different angle. FIG. 9 shows a welded side coil end face of the stator core 21 as seen in a direction orthogonal to the radial direction of the stator core. Hereinafter, the electrical connection conductor 33 will be handled as the neutral point bus-bar. Hence, the electrical connection conductor will hereinbelow be written as the neutral point bus-bar.

Referring to FIG. 8 and FIG. 9, the segment coil 34 on the innermost circumference side of the slot 37 forming a terminal section of the respective phase is formed with, in a circumferential and clockwise order: the first W-phase input terminal 31AW of the first W-phase coil 30AW; the first V-phase input terminal 31AV of the first V-phase coil 30AV; and the first U-phase input terminal 31AU of the first U-phase coil 30AU.

Similarly, the segment coil on the innermost circumference is formed with: a second U-phase neutral point 32BU of the second U-phase coil 30BU; a second W-phase neutral point 32BW of the second W-phase coil 30BW; and a second V-phase neutral point 32BU of the second V-phase coil 30BV. These input terminals and the neutral points are alternately formed in a repeating manner of input terminal-⇒neutral point ⇒input terminal . . . .

On the other hand, the segment coil 34 on the outermost circumference side of the slot 37 forming the terminal section is formed with, in a circumferential and clockwise order: a first W-phase neutral point 32AW of the first W-phase coil 30AW; a first V-phase neutral point 32AV of the first V-phase coil 30AV; and a first U-phase neutral point 32AU of the first U-phase coil 30AU.

Similarly, the segment coil on the outermost circumference side is formed with: a second U-phase input terminal 31BU of the second U-phase coil 30BU; a second W-phase input terminal 31BW of the second W-phase coil 30BW; and a second V-phase input terminal 31BV of the second V-phase coil 30BV. These input terminals and the neutral points are alternately disposed in a repeating manner of input terminal⇒neutral point⇒input terminal . . . .

As shown in FIG. 8 and FIG. 9, an input line 40AW extends from the W-phase input section 31CW to the first W-phase input terminal 31AW of the first W-phase coil 30AW. Further, an input line 40BW extends to a second W-phase input terminal 31BW of the second W-phase coil 30BW.

The input line 40AW to the first W-phase input terminal 31AW on the innermost circumferential side extends through space between lines of welded sections 39 formed by welding together tops of the welded terminal sections 36a, 36r of the segment coil 34 extended from one slot 37 and a top of the welded terminal section 36r, 36a of the segment coil 34 extended from another slot 37.

Namely, the input line 40AW is laid in a radial space (valley) defined between the two adjoining lines of the welded sections 39, the lines extending in the radial direction. This radial space is a space defined by the welded terminal sections 36a, 36r of the segment coils 34 on the end face section 38 of the stator core 21 in a state where the segment coils 34 are radially stacked and mounted. The radial space will be described in detail with reference to FIG. 10.

As just described, the input line 40AW is wholly or partially laid in the radial space defined between the welded terminal sections 36a, 36r as seen in the axial direction. Hence, the amount of axial protrusion of the input line 40AW from the top of the welded section 39 can be reduced. If the input line 40AW is wholly laid in the radial space, the axial protrusion of the input line is naturally reduced even more.

The input line 40BW extended to the second W-phase input terminal 31BW is laid on an outer side from the outermost circumferential side segment coil 34. This is also effective to reduce the axial protrusion of the input line 40BW from the top of the welded section 39.

Likewise, an input line 40AV extends from the V-phase input section 31CV to the first V-phase input terminal 31AV of the first V-phase coil 30AV, while an input line 40BV extends from the V-phase input section 31CV to the second V-phase input terminal 31BV of the second V-phase coil 30BV. Furthermore, an input line 40AU extends from the U-phase input section 31CU to the first U-phase input terminal 31AU of the first U-phase coil 30AU, while an input line 40BU extends from the U-phase input section 31CU to the second U-phase input terminal 31BU of the second U-phase coil 30BU. These input lines also have the same configurations as the W-phase input lines 40AW, 40BW and hence, the axial protrusion of the input lines from the top of the welded section 39 can be reduced.

Next, the description is made on the neutral point bus-bar 33 with reference to FIG. 9. The neutral point bus-bar 33 is provided with connection sections which are connected with the neutral points of the individual phase coils and connected with the neutral points in clockwise turns. These neutral points are connected via a circumferential connection wiring section 33C and a radial connection wiring section 33R which constitutes the neutral point bus-bar 33.

It is noted here that the circumferential connection wiring section 33C and the radial connection wiring section 33R are each formed by bending an elongate piece of metal sheet in the same plane shape. The circumferential connection wiring section 33C is connected to the individual neutral points by welding.

First, the circumferential connection wiring section is connected to the first W-phase neutral point 32AW of the first W-phase coil 30AW located on the outermost circumference of a W1-phase slot 37. Next, the circumferential connection wiring section is connected to the second U-phase neutral point 32BU of the second U-phase coil 30BU located on the innermost circumference of a U2-phase slot 37, then connected to the first V-phase neutral point 32AV of the first V-phase coil 30AV located on the outermost circumference of a V1-phase slot 37. Next, the circumferential connection wiring section is connected to the second W-phase neutral point 32BW of the second W-phase coil 30BW located on the innermost circumference of a W2-phase slot 37, then connected to the first U-phase neutral point 32AU of the first U-phase coil 30AU located on the outermost circumference of a U1-phase slot 37, and finally connected to the second V-phase neutral point 32BV of the second V-phase coil 30BV located on the innermost circumference of a V2-phase slot 37.

The circumferential connection wiring section 33C is classified into an inner circumference side and an outer circumference side. The circumferential connection wiring section 33C on the inner circumference side is laid along the outer circumference (as seen in the radial direction) of the welded terminal section 36a, 36r of the segment coil 34 located on the innermost circumference of the slot 37 and is fixed in position by welding. The circumferential connection wiring section 33C on the outer circumference side is laid along the outer circumference (as seen in the radial direction) of the welded terminal section 36a, 36r of the segment coil 34 located on the outermost circumference of the slot 37 and is fixed in position by welding.

Specifically, the circumferential connection wiring section 33C on the inner circumference side is laid between the welded terminal section 36a, 36r of the segment coil 34 on the innermost circumference side and the welded terminal section 36a, 36r of its adjoining segment coil 34, and is welded to the welded terminal section 36a, 36r of the segment coil 34 on the innermost circumference side. The circumferential connection wiring section 33C on the outer circumference side is laid on the outer circumference side of the welded terminal section 36a, 36r of the segment coil 34 on the outermost circumference side and is welded to the welded terminal section 36a, 36r of the segment coil 34 on the outermost circumference side.

The axial positions of the circumferential connection wiring sections 33C on the inner circumference side and the outer circumference side are set in a range where the welded terminal sections 36a, 36r exist. Specifically, the circumferential connection wiring section 33C has its end face opposed to the end face section 38 of the stator 21 so defined as not protrude beyond the welded section 39 of the welded terminal sections 36a, 36r. In this manner, the circumferential connection wiring section 33C is wholly or partially laid in space defined between the welded terminal sections 36a, 36r as seen in the axial direction. Hence, the circumferential connection wiring section 33C can be reduced in the amount of axial protrusion from the top of the welded section 39.

On the other hand, the circumferential connection wiring section 33C on the inner circumference side and the circumferential connection wiring section 33C on the outer circumference side are consecutively connected by means of the radial connection wiring section 33R. The radial connection wiring section 33R is laid in a radial space defined between a line of the welded section 39 radially formed by welding the welded terminal section 36a, 36r of the segment coil 34 accommodated in the slot 37 and its adjoining line of the welded section 39.

Figure 10:
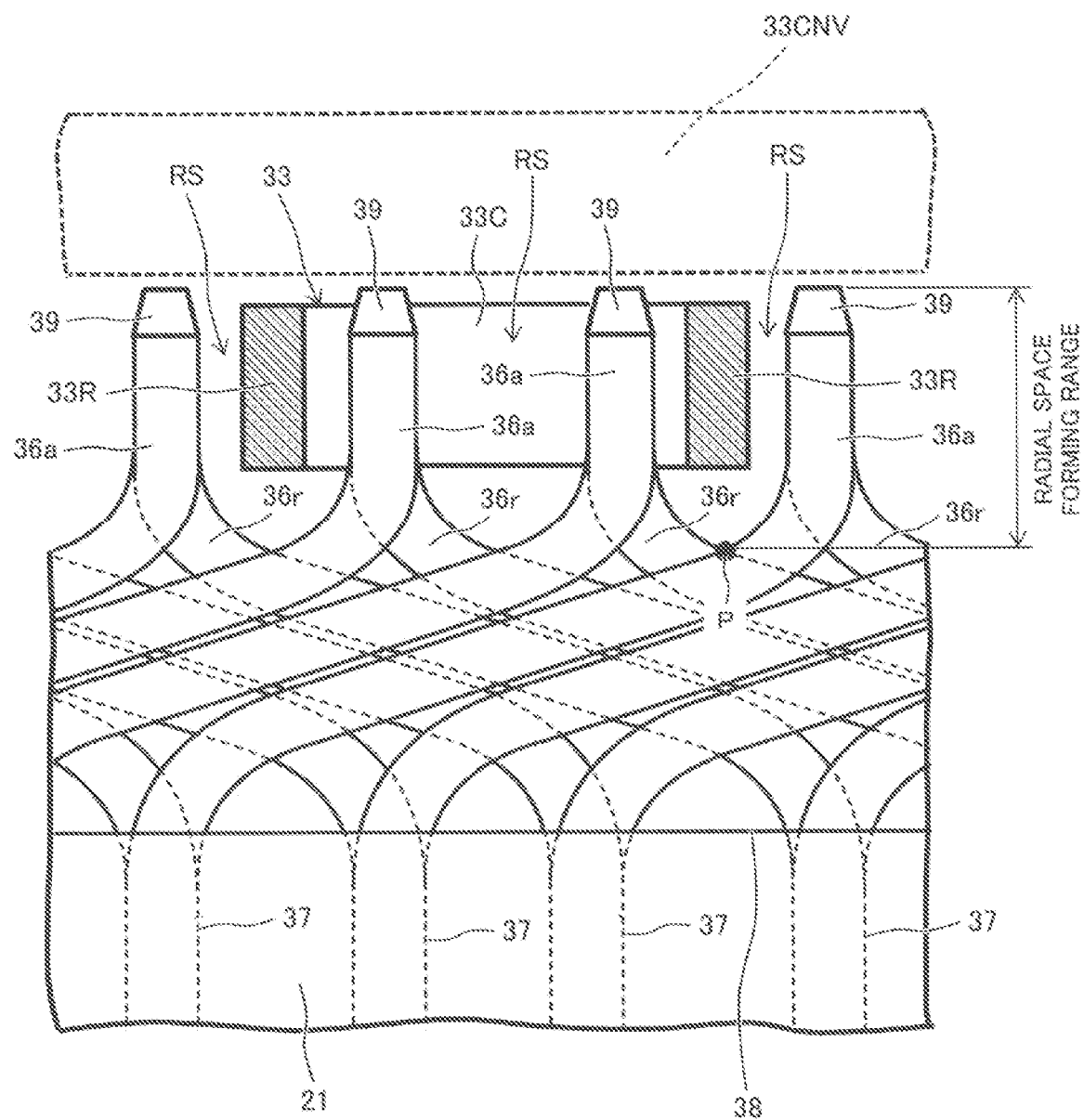
FIG. 10 is an enlarged view, as seen in a radial direction, of welded side coil ends of the segment coils of the electrical connection conductor according to an embodiment of the present invention which is wholly laid in a radial space. Note that a part of the electrical connection conductor is shown in section.

From another perspective point of view, as shown in FIG. 10, the radial connection wiring section 33R is laid between the two adjoining slots 37 extending in the radial direction, or laid in the radial space extending in the radial direction as defined by the welded terminal sections 36a, 36r of the segment coils 34.

In this manner, the whole of the neutral point bus-bar (electrical connection conductor) 33 is laid as shifted axially of the stator core 21 and closer to the end face section 38 of the stator core 21 than the welded section 39. It goes without saying that a distance between the welded terminal section 36a, 36r of the segment coil 34 and the radial connection wiring section 33R is so defined as to provide a sufficient insulation spatial distance for ensuring electrical insulation. An electrically insulating paint or an electrically insulating coating can be applied to the whole body of the neutral point bus-bar 33 to enhance the insulation properties of the neutral bus-bar even further.

FIG. 10 shows a state of the welded side coil end 36 as seen from an inner circumference side. A radial space RS open in the radial direction and in the axial direction is defined between a radial line of the welded section 39 of the welded terminal sections 36a, 36r of two segment coils 34 and its adjoining radial line of the welded sections 39 of the welded terminal sections 36a, 36r of two segment coils 34.

The radial connection wiring section 33R is laid in this radial space RS in a manner to be accommodated therein. The radial space RS is defined to mean an axial space extending from a portion (P) of intersection between adjoining different welded terminal sections 36a, 36r to the welded section 39, the adjoining different welded terminal sections 36a, 36r extending from the welded section 39 to the side of the end face section 38 of the stator core 21. As a matter of course, this radial space RS also extends in the radial direction, as described above.

Therefore, the axial position of the radial connection wiring section 33R is set in the range where the welded terminal sections 36a, 36r exist. That is, the radial connection wiring section 33R has its end facing the end face section 38 of the stator 21 set to such a position as not to protrude beyond the welded section 39 of the welded terminal sections 36a, 36r. As just described, the radial connection wiring section 33R is wholly or partially laid in the radial space defined between the adjoining radial lines of the welded sections 39. Hence, the amount of axial protrusion of the radial connection wiring section 33R from the top of the welded section 39 can be reduced.

In the rotary electrical machine according to Patent Literature 1, a neutral point bus-bar 33CNV indicated by the dotted line is laid in the arrangement direction (circumferential direction) of the slots 37 in a manner to cover the welded section 39 of the coil ends 36 and to extend over the plural slots. Accordingly, the neutral point bus-bar 33CNV is inevitably disposed at position protruded from the welded section 39, interfering with the axial downsizing of the machine.

According to the embodiment, on the other hand, the neutral point bus-bar 33 is accommodated and laid in the radial space RS. Therefore, an end face of the neutral point bus-bar 33, which is on the side of the end face section 38 of the stator 21, can be located at place at least axially closer to the end face section 38 than the welded section 39. Therefore, the axial downsizing of the machine can be achieved.

Figure 11:
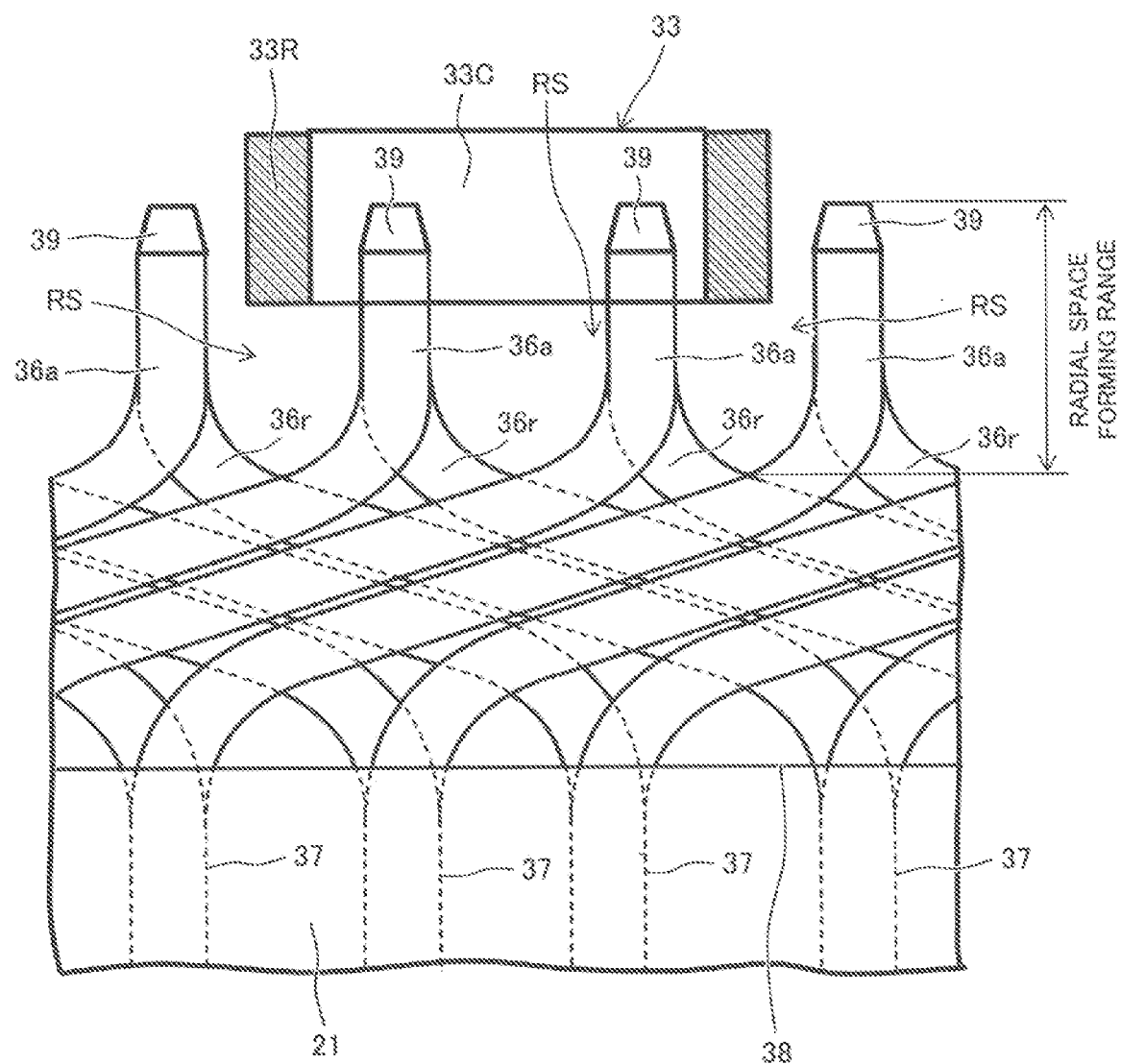
FIG. 11 is an enlarged view, as seen in the radial direction, of the welded side coil ends of the segment coils of the electrical connection conductor according to an embodiment of the present invention which is partially laid in the radical space (Note that a part of the electrical connection conductor is shown in section).

It is noted here that a technical meaning of that the end face of the neutral point bus-bar 33, which is on the side of the end face section 38 of the stator 21, is located at place at least closer to the end face section 38 as axially seen from the welded section 39 indicates a configuration shown in FIG. 11.

As shown in FIG. 11, the neutral point bus-bar 33 is only halfway accommodated and laid in the radial space RS. As compared with the conventional neutral point bus-bar 33CNV which is laid in the arrangement direction (circumferential direction) of the slots 37 in the manner to cover the welded section 39 of the coil ends 36 and extend over the plural slots. However, the neutral point bus-bar 33 of the embodiment is accommodated and laid in the radial space RS although not fully. Thus, the axial downsizing of the machine can be achieved accordingly.

As a matter of course, the most preferred placement of the neutral point bus-bar 33 for achieving the axial downsizing of the machine is to lay the neutral point bus-bar 33 at such a position that the neutral point bus-bar 33 does not protrude from the welded section 39 of the welded terminal sections 36*a*, 36*r* as seen in the axial direction, as shown in FIG. 10. According to this approach, the whole of the neutral point bus-bar 33 is accommodated and laid in the radial space RS. Hence, much further axial downsizing of the machine can be achieved.

Returning to FIG. 9, the input line 40AV of the first V-phase coil 30AV and the input line 40AU of the first U-phase coil 30AU are led in from the side of the end face section 38 of the stator core 21 with respect to the neutral point bus-bar 33 to be connected to their respective first V-phase input terminals 31AV and first U-phase input terminals 31AU. After the connection work of the input line 40AV, the input line 40AU, and the input line 40AW, the neutral point bus-bar 33 is welded and connected.

The circumferential length of the circumferential connection wiring section 33C on the outer circumference side is defined to be longer than that of the circumferential connection wiring section 33C on the inner circumference side. This provides for a smooth placement of the radial connection wiring section 33R at place between the adjoining lines of the welded sections 39 without interference with the welded section 39. Needless to say, a circumferential length of the radial connection wiring section 33C on the outer circumference side is properly defined according to the placement position of the radial connection wiring section 33R.

Furthermore, the inner circumference side circumferential connection wiring section 33C connected to the neutral points 32BU, 32BW, 32BV located on the inner circumference side is connected to the neutral points 32BU, 32BW, 32BV at outer circumference side face thereof. This affords a working effect that the circumferential connection wiring section 33C is not located at a tip side of teeth so as to avoid mechanical interference with the rotor 16 rotatably accommodated in the stator core 21.

The outer circumference side circumferential connection wiring section 33C connected to the neutral point 32AW, 32AV, 32AU located on the outer circumference side is connected to the neutral point 32AW, 32AV, 32AU on the outer circumference side. When welding work is performed, the circumferential connection wiring section 33C on the inner circumference side and the circumferential connection wiring section 33C on the outer circumference side are welded together by means of a welding tool (TIG welding). This approach affords a working effect that the welding work is facilitated because the welding tool can be inserted in the same direction.

The neutral points 32AW, 32AV, 32AU, 32BU, 32BW, 32BV of the individual phases are connected by means of the neutral point bus-bar 33 made of a piece of flat metal sheet. This approach affords functional effects that the configuration is simplified and the welding work is facilitated.

Figure 12:
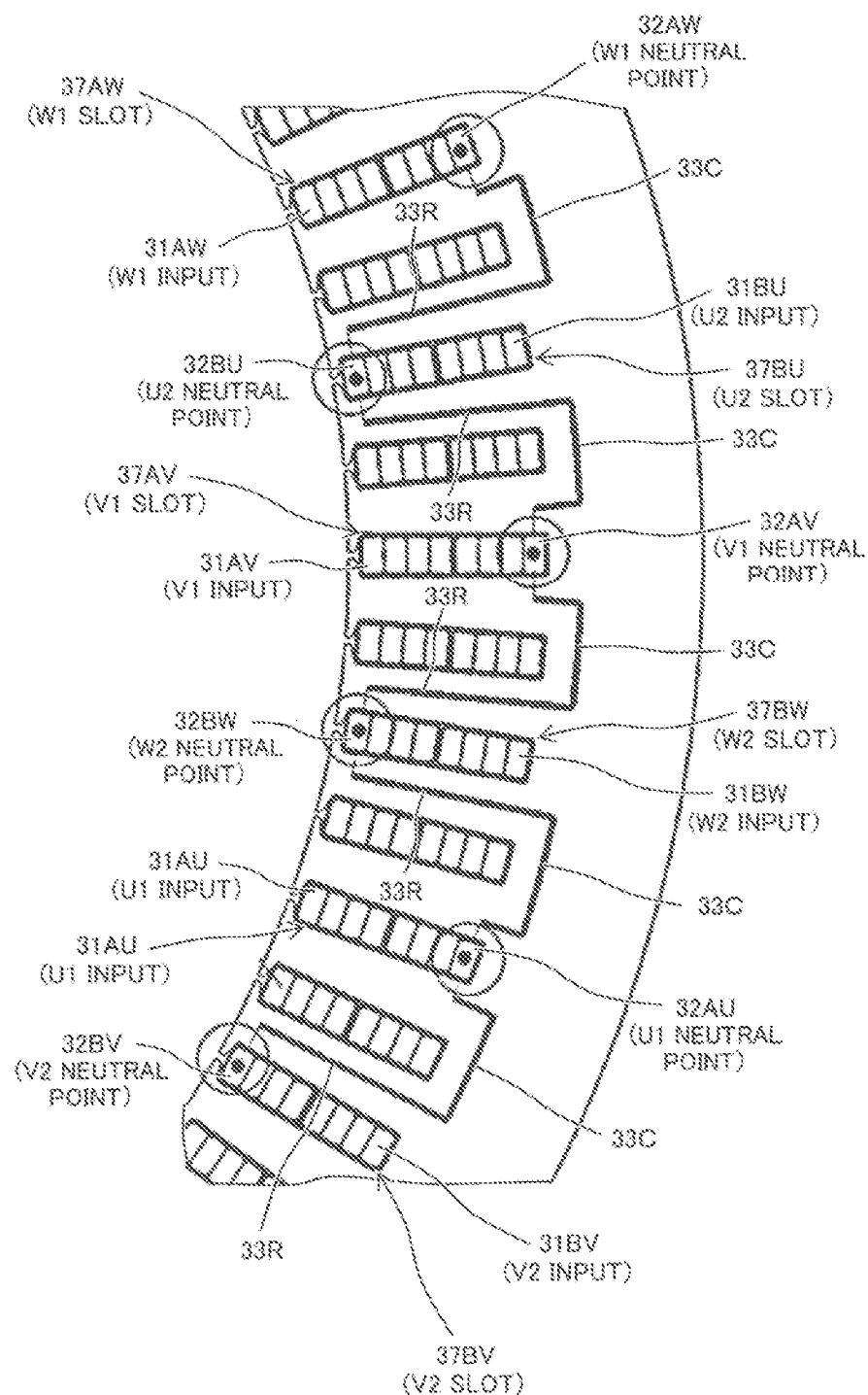
FIG. 12 is an explanatory diagram illustrating a connection state of the electrical connection conductors shown in FIG. 9.

Next, a brief description is made on a wire connection mode according to the embodiment shown in FIG. 8. FIG. 12 shows the slots of the individual phase coils in the vicinity of the neutral point bus-bar 33.

In a terminal slot 37AW of the first W-phase coil 30AW, eight segment coils 34 radially are radially stacked from the inner circumference side to the outer circumference side, as shown in FIG. 6. This terminal slot 37AW includes the segment coils 34 all of which are of the same phase. The first W-phase input terminal 31AW of the first W-phase coil 30AW is connected to the innermost circumferential layer 1. The first W-phase neutral point 32AW of the first W-phase coil 30AW is formed at the outermost circumferential layer 8. The segment coils 34 of a layer 2 and a layer 3, the segment coils 34 of a layer 4 and a layer 5, and the segment coils 34 of a layer 6 and a layer 7 are welded together at the welded sections 39.

A terminal slot 37BU of the second U-phase coil 30BU also contains therein eight segment coils 34 radially stacked from the inner circumferential side to the outer circumferential side. This terminal slot 37BU also includes the segment coils 34 all of which are of the same phase. The second U-phase neutral point 32BU of the second U-phase coil 30BU is formed at the innermost circumferential layer 1. The second U-phase input terminal 31BU of the second U-phase coil 30BU is connected to the outermost circumferential layer 8.

A terminal slot 37AV of the first V-phase coil 30AV also contains therein eight segment coils 34 radially stacked from the inner circumference side to the outer circumferential side. This terminal slot 37AW also includes the segment coils 34 all of which are of the same phase. The first V-phase input terminal 31AV of the first V-phase coil 30AV is connected to the innermost circumferential layer 1. The first V-phase neutral point 32AV of the first V-phase coil 30AV is formed at the outermost circumferential layer 8. The rest of the configuration is the same as the first W-phase coil 30AW.

A terminal slot 37BW of the second W-phase coil 30BW also contains therein eight segment coils 34 radially stacked from the inner circumferential side to the outer circumferential side. This terminal slot 37BW also includes the segment coils 34 all of which are of the same phase. The second W-phase neutral point 32BW of the second W-phase coil 30BW is formed at the innermost circumferential layer 1. The second W-phase input terminal 31BW of the second W-phase coil 30BW is connected to the outermost circumferential layer 8. The rest of the configuration is the same as the first W-phase coil 30AW.

A terminal slot 37AU of the first U-phase coil 30AU also contains therein eight segment coils 34 radially stacked from the inner circumferential side to the outer circumferential side. This terminal slot 37AU also includes the segment coils 34 all of which are of the same phase. The first U-phase input terminal 31AU of the first U-phase coil 30AU is connected to the innermost circumferential layer 1. The first U-phase neutral point 32AU of the first U-phase coil 30AU is formed at the outermost circumferential layer 8. The rest of the configuration is the same as the first W-phase coil 30AW.

A terminal slot 37BV of the second V-phase coil 30BV also contains therein eight segment coils 34 radially stacked from the inner circumferential side to the outer circumferential side. This terminal slot 37BV also includes the segment coils 34 all of which are of the same phase. The second V-phase neutral point 32BU of the first V-phase coil 30BV is formed at the innermost circumferential layer 1. The second V-phase input terminal 31BV of the first V-phase coil 30BV is connected to the outermost circumferential layer 8. The rest of the configuration is the same as the first W-phase coil 30AW.

The first W-phase neutral point 32AW of the first W-phase coil 30AW is connected to the second U-phase neutral point 32BU of the second U-phase coil 30BU by means of the circumferential connection wiring section 33C on the outer circumference side and the radial connection wiring section 33R. Similarly, the second U-phase neutral point 32BU of the second U-phase coil 30BU is connected to the first V-phase neutral point 32AV of the first V-phase coil 30AV by means of the radial connection wiring section 33R and the circumferential connection wiring section 33C on the outer circumference side.

Similarly, the first V-phase neutral point 32AV of the first V-phase coil 30AV and the second W-phase neutral point 32BW of the second W-phase coil 30BW; the second W-phase neutral point 32BW of the second W-phase coil 30BW and the first U-phase neutral point 32AU of the first U-phase coil 30AU; and the first U-phase neutral point 32AU of the first U-phase coil 30AU and the second V-phase neutral point 32BV of the second V-phase coil 30BV are interconnected by means of the radial connection wiring section 33R and the circumferential connection wiring section 33C on the outer circumference side. In this manner, the neutral point bus-bars 33 in FIG. 12 connect the neutral points of phase coils of mutually different phases.

As can be seen from FIG. 12, the radial connection wiring section 33R and the circumferential connection wiring section 33C are configured to interconnect the segment coil 34 on the outermost circumference of one slot 37 and the segment coil on the innermost circumference of another slot 37. For example, the segment coil 34 on the outermost circumference in one terminal slot 37 is defined as the neutral point while the segment coil 34 on the innermost circumference of another terminal slot 37 is defined as the neutral point. These neutral points are interconnected by means of the radial connection wiring section 33R and the circumferential connection wiring section 33C on the outer circumference side. This approach permits these connection wiring sections to interconnect the neutral points without circumferentially extending over the welded sections 39 formed on the slot 37. Thus, the axial downsizing of the rotary electrical machine can be achieved.

Example 2

Figure 13:
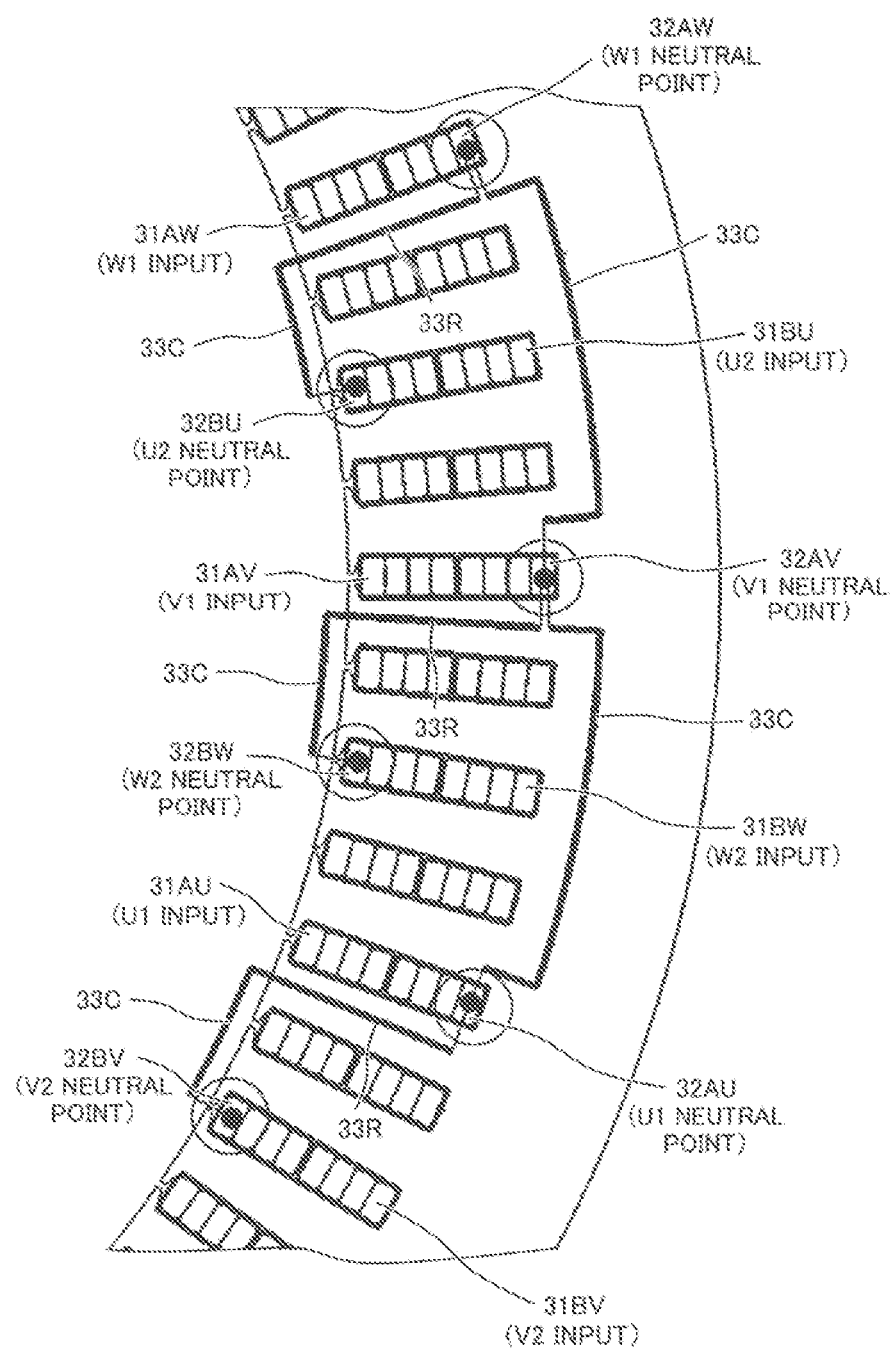
FIG. 13 is an explanatory diagram illustrating a connection state of the electrical connection conductors according to a second embodiment of the present invention.

Next, the description is made on a connection wiring mode different from that shown in FIG. 12. FIG. 13 shows slots of phase coils of different phases near locations of the neutral point bus-bar 33. It is noted that the terminal slots of the dividual phase coils are configured the same way as that shown in FIG. 12.

The first W-phase neutral point 32AW of the first W-phase coil 30AW is connected to the second U-phase neutral point 32BU of the second U-phase coil 30BU by means of the radial connection wiring section 33R and the circumferential connection wiring section 33C continuously formed thereto on the inner circumferential side. Further, the first W-phase neutral point 32AW of the first W-phase coil 30AW is connected to the first V-phase neutral point 32AV of the first V-phase coil 30AV by means of the circumferential connection wiring section 33C on the outer circumference side.

The first V-phase neutral point 32AV of the first V-phase coil 30AV is connected to the second W-phase neutral point 32BW of the second W-phase coil 30BW by means of the radial connection wiring section 33R and the circumferential connection wiring section 33C continuously formed thereto on the inner circumferential side. Further, the first V-phase neutral point 32AV of the first V-phase coil 30AV is connected to the first U-phase neutral point 32AU of the first U-phase coil 30AU by means of the continuously formed circumferential connection wiring section 33C on the outer circumferential side.

Further, the first U-phase neutral point 32AU of the first U-phase coil 30AU is connected to the second V-phase neutral point 32BV of the second V-phase coil 30BV by means of the radial connection wiring section 33R and the circumferential connection wiring section 33C continuously formed thereto on the inner circumferential side.

As seen from the above, the neutral point bus-bar 33 of FIG. 13 is also constituted by four electrical connection conductors including: one circumferential connection wiring section 33C on the outer circumferential side, three radial connection wiring section 33R, and the inner circumferential side circumferential connection wiring section 33C continuous thereto. These conductors connect the neutral points of phase coils of mutually different phases.

In contrast to the neutral point bus-bar of FIG. 12 formed by bending one flat sheet, the neutral point bus-bar 33 shown in FIG. 13 is divided into four segments so that the circumferential length thereof is shortened. Hence, this bus-bar is inflexible, facilitating the welding work.

Similarly to the configuration of FIG. 12, the segment coil 34 on the outermost circumferential side of the terminal slot 37 is defined as the neutral point while the segment coil 34 on the innermost circumferential side of the terminal slot 37 is defined as the neutral point, and these neutral points are interconnected by means of the radial connection wiring section 33R and the circumferential connection wiring section 33C on the outer circumference side. By doing so, the neutral points can be interconnected without circumferentially extending the connection conductor over the welded section 39 formed on the slot 37. Thus, the axial downsizing of the rotary electrical machine can be achieved.

Example 3

FIG. 12 and FIG. 13 illustrate the examples where the neutral point bus-bar 33 interconnects the segment coils 34 of different phases. It is possible to lay an electrical connection conductor interconnecting the segment coils of the same phase in the radial space RS instead of arranging the electrical connection conductor interconnecting the segment coils of different phases.

Figure 14:
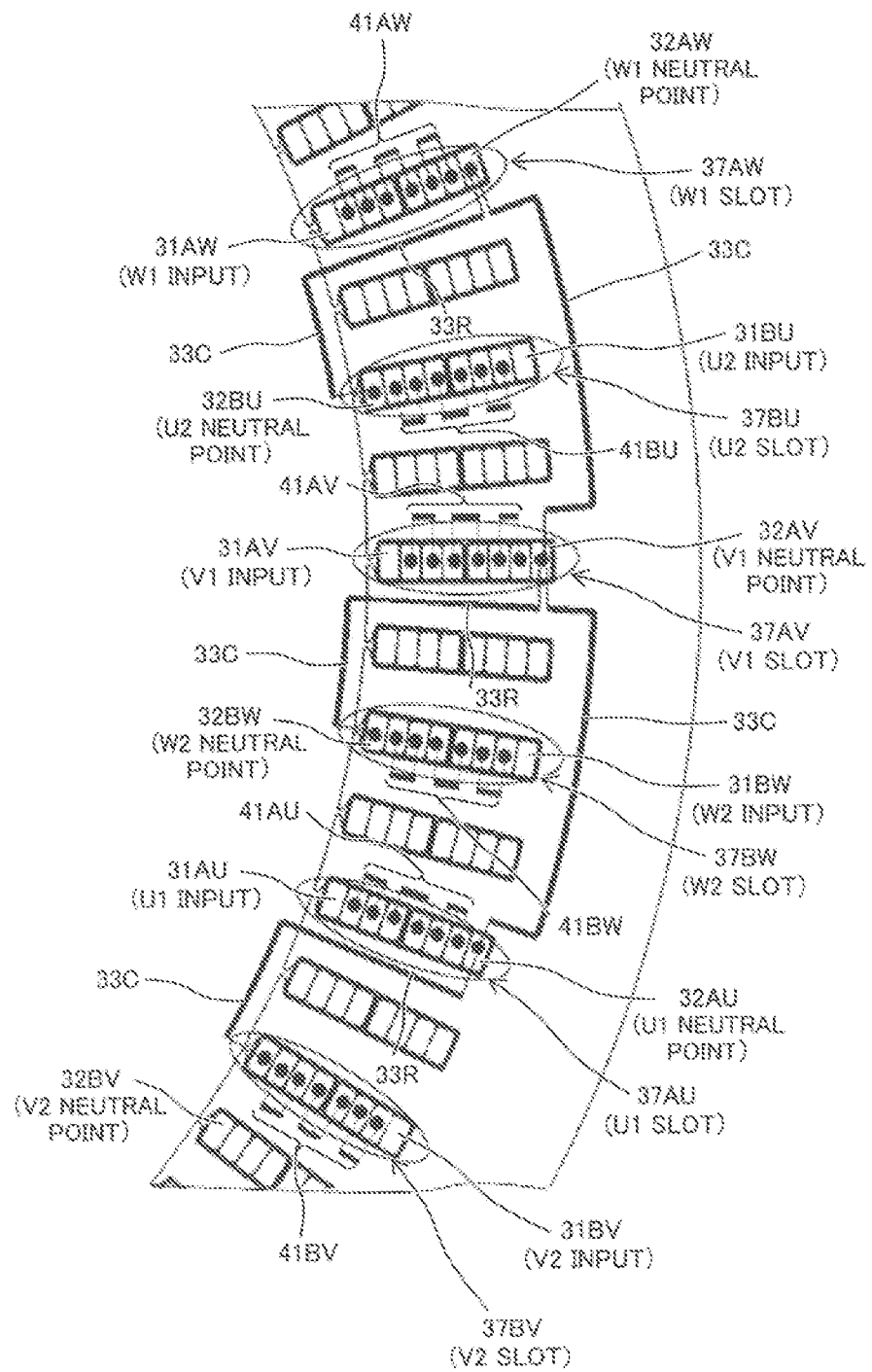
FIG. 14 is an explanatory diagram illustrating a connection state of the electrical connection conductors according to a third embodiment of the present invention.

FIG. 14 shows the slots of the individual phases near the location of the neutral point bus-bar 33. The configurations of the terminal slots of the individual phases are the same as those shown in FIG. 13.

Referring to FIG. 14, the segment coils 34 of layer 1 to layer 8 are accommodated in the terminal slot 37AW of the first W-phase coil, as illustrated in FIG. 6. These are the first W-phase components. The innermost circumferential segment coil 34 is the first W-phase input terminal while the outermost circumferential segment coil 34 is the first W-phase neutral point.

As for the segment coils 34 between these and the neutral point, the segment coils 34 of the layer 2 and the layer 3 are electrically interconnected; the segment coils 34 of the layer 4 and the layer 5 are electrically interconnected, and the segment coils 34 of the layer 6 and of the layer 7 are electrically interconnected. Namely, a pair of the segment coils 34 of the layer 2 and the layer 3; a pair of the segment coils 34 of the layer 4 and layer 5; and a pair of the segment coils 34 of the layer 6 and layer 7 are respectively interconnected by means of three electrical connection conductors 41AW.

Similarly, the respective pairs of segment coils 34 of the layer 1 to the layer 8 accommodated in the terminal slot 37BU of the second U-phase coil 30BU are electrically interconnected by means of three electrical connection conductors 41BU. Further, the respective pairs of segment coils 34 of the layer 1 to the layer 8 accommodated in the terminal slot 37AV of the first V-phase coil 30AV are electrically interconnected by means of three electrical connection conductors 41AV.

Further, the respective pairs of segment coils 34 of the layer 1 to the layer 8 accommodated in the terminal slot 37BW of the second W-phase coil 30BW are electrically interconnected by means of three electrical connection conductors 41BW. Furthermore, the respective pairs of segment coils 34 of the layer 1 to the layer 8 accommodated in the terminal slot 37AU of the first U-phase coil 30AU are electrically interconnected by means of three electrical connection conductors 41AU. Further, the respective pairs of the segment coils 34 of the layer 1 to the layer 8 accommodated in the terminal slot 37BV of the second V-phase coil 30BV are electrically interconnected by means of three electrical connection conductors 41BV.

According to the embodiment shown in FIG. 14, as just described, the segment coils of the same phase are interconnected by means of the electrical connection conductors 41AW to 41BV. What is more, the electrical connection conductors 41AW to 41BW are laid in the radial space RS defined between the radial line of the welded section 39 of the welded terminal sections 36a, 36r of two segment coils 34 and its adjoining radial line of the welded section 39 of the welded terminal sections 36a, 36r of two segment coils 34.

Therefore, the electrical connection conductor 41AW to 41BW can be laid at position at least axially closer to the end face section 38 of the stator coil 21 than the welded section 39. Therefore, the axial downsizing of the machine can be achieved.

According to this embodiment as well, the neutral point bus-bar 33 is accommodated and laid in the radial space RS. Therefore, the neutral point bus-bar 33 has its end face opposed to the end face section 38 of the stator 21 located at position at least axially closer to the end face section 38 than the welded section 39. Therefore, the axial downsizing of the machine can be achieved.

In the rotary electrical machine which includes: the stator core including slots radially extended in a radial fashion; a plurality of segment coils radially stacked on top of each other and accommodated in the slots; and the electrical connection conductor which includes the connection wiring section and the connection section and which is laid on a side of the welded coil end of the segment coil, as described above, the present invention is characterized in that in a state where the segment coils are mounted, at least a part of the connection wiring section is laid in the radial space defined by the segment coils.

According to the present invention, the connection wiring section can be laid in the radial space radially defined by the segment coils so that the axial elongation of a configuration space for the electrical connection conductor is prevented. Thus, the axial downsizing of the rotary electrical machine can be achieved.

It is noted that the present invention is not limited to the foregoing embodiments and includes a variety of modifications. The foregoing embodiments, for example, are the detailed illustrations to clarify the present invention. The present invention is not necessarily limited to those including all the components described above. Some component of one embodiment can be replaced by some component of another embodiment. Further, some component of one embodiment can be added to the arrangement of another embodiment. A part of the arrangement of each embodiment permits addition of some component of another embodiment, the omission thereof or replacement thereof.

REFERENCE SIGNS LIST

21: stator core,
22A: first coil assembly
22B: second coil assembly
30AU: first U-phase coil
30AV: first V-phase coil
30AW: first W-phase coil
30BU: second U-phase coil
30BV: second V-phase coil
30BW: second W-phase coil
31AU: first U-phase input terminal
31AV: first V-phase input terminal
31AW: first W-phase input terminal
31BU: second U-phase input terminal
31BV: second V-phase input terminal
31BW: second W-phase input terminal
32AU: first U-phase neutral point
32AV: first V-phase neutral point
32AW: first W-phase neutral point
32BU: second U-phase neutral point
32BU: second V-phase neutral point
32BW: second W-phase neutral point
33: electrical connection conductor (neutral point bus-bar)

33C: circumferential connection wiring section
33R: radial connection wiring section
34: segment coil
36a: welded terminal section
36r: welded terminal section
37: slot
38: end face
39: welded section
RS: radial space

The invention claimed is:

1. A rotary electrical machine comprising:
a stator core including a plurality of slots radially extended in a radial fashion;
a plurality of segment coils radially stacked and accommodated in the slot; and
an electrical connection conductor interconnecting the different segment coils as laid on a side of a welded coil end of the segment coil, and including a connection wiring section and a connection section,
wherein in a state where the segment coils are mounted, at least a part of the connection wiring section is laid in a radial space radially defined by the segment coils;
wherein the radial space is defined between a radial line of welded sections formed by welding together welded terminal sections of the segment coils accommodated in the two different slots and another radial line of the welded sections adjoining the above line of welded sections, and
a radial connection wiring section forming a part of the connection wiring section is laid in the radial space.

2. The rotary electrical machine according to claim 1,
wherein the connection wiring section includes: the radial connection wiring section laid in the radial space; and a circumferential connection wiring section formed on an inner circumferential side and an outer circumferential side of the slot, and
the radial connection wiring section and the circumferential connection wiring section are continuously formed.

3. The rotary electrical machine according to claim 1,
wherein the connection wiring section includes: the radial connection wiring section laid in the radial space; and a circumferential connection wiring section formed on an inner circumferential side or an outer circumferential side of the slot, and
at least the radial connection wiring section and the circumferential connection wiring section on the inner circumferential side are continuously formed.

4. The rotary electrical machine according to claim 2
wherein a phase coil formed of the segment coil is star-connected, and
the electrical connection conductor is a neutral point bus-bar for connecting a neutral point of the phase coil, and the connection section of the electrical connection conductor is connected to the neutral point of the phase coil.

5. A rotary electrical machine comprising:
a stator core including a plurality of slots radially extended in a radial fashion;
a first coil assembly which includes a three-phase coil formed of a plurality of segment coils radially stacked and accommodated in the plural slots and has the three-phase coils star-connected; and a second coil assembly which also has the three-phase coils star-connected; and
a neutral point bus-bar laid on a side of a welded coil end of the segment coil and interconnecting a neutral point of the phase coil of the first coil assembly and a neutral point of the phase coil of the second coil assembly,
wherein a part of the neutral point bus-bar is laid in a radial space defined between a radial line of welded sections formed by welding together welded terminal sections of the segment coils accommodated in the two different slots and another radial line of the welded sections adjoining the above line of welded sections, and
the neutral point bus-bar other than the neutral point bus-bar laid in the radial space is laid on an inner circumferential side and an outer circumferential side of the slot.

6. The rotary electrical machine according to claim 5,
wherein the neutral point bus-bar includes: a radial connection wiring section laid in the radial space; and a circumferential connection wiring section formed on the inner circumferential side and the outer circumferential side of the slot, and
the radial connection wiring section and the circumferential connection wiring section are laid at places shifted axially of the stator core and closer to the end face section of the stator core than the welded section of the segment coil.

7. The rotary electrical machine according to claim 5,
wherein the inner circumferential side segment coil in the slot of each phase coil is formed with an input terminal for the phase coil of the first coil assembly and with the neutral point for the phase coil of the second coil assembly,
an outer circumferential side segment coil in the slot of each phase coil is formed with the input terminal for the phase coil of the second coil assembly and with the neutral point for the phase coil of the first coil assembly,
the inner circumferential side circumferential connection wiring section of the neutral point bus-bar is connected to the neutral point of the phase coil of the second coil assembly,
the outer circumferential side circumferential connection wiring section of the neutral point bus-bar is connected to the neutral point of the phase coil of the first coil assembly, and
the radial wiring connection section interconnects the inner circumferential side circumferential connection wiring section and the outer circumferential side circumferential connection wiring section.

8. The rotary electrical machine according to claim 6,
wherein the input terminal and the neutral point formed on the inner circumferential side are alternately formed, and
the input terminal and the neutral point on the outer circumferential side are alternately formed as well.

9. The rotary electrical machine according to claim 7,
wherein of the segment coils arranged in the same slot, the segment coil located on the inner circumferential side is the input terminal or the neutral point, and
the segment coil located on the outer circumferential side is the neutral point or the input terminal.

10. The rotary electrical machine according to claim 8,
wherein a circumferential length of the outer circumferential side circumferential connection wiring section of the neutral point bus-bar is defined to be longer than a circumferential length of the inner circumferential side circumferential connection wiring section.

11. The rotary electrical machine according to claim 9, wherein the inner circumferential side circumferential connection wiring section of the neutral point bus-bar is connected to an outer circumferential surface of the segment coil located on an inner circumferential side of the slot.

* * * * *